United States Patent [19]
Weisman

[11] 3,718,319
[45] Feb. 27, 1973

[54] APPARATUS AND PROCESS FOR CONTACTING IMMISCIBLE LIQUIDS

[75] Inventor: Irving H. Weisman, Palisades Park, N.J.

[73] Assignee: The United States of America as represented by the Secretary of the Army

[22] Filed: Nov. 16, 1971

[21] Appl. No.: 199,166

[52] U.S. Cl. .......................... 259/4, 23/285, 259/95
[51] Int. Cl. ................................................. B01f 15/00
[58] Field of Search ............. 259/4, 95, 98, 96, 18, 2; 23/252, 285, 267

[56] References Cited

UNITED STATES PATENTS

| | | |
|---|---|---|
| 3,469,948 | 9/1969 | Anderson .......................... 23/285 |
| 3,505,029 | 4/1970 | Polgar ............................... 23/285 |
| 3,517,732 | 6/1970 | Brebant .............................. 259/95 |
| 3,531,093 | 9/1970 | Karpacheva ........................ 259/4 |
| 3,661,364 | 5/1972 | Lage .................................. 259/4 |

*Primary Examiner*—Robert W. Jenkins
*Attorney*—Harry M. Saragovitz et al.

[57] ABSTRACT

A process and apparatus for contacting a liquid phase of one density with another liquid phase of different density immiscible therewith. The apparatus includes a horizontal tank, wherein the two liquids form an upper layer and a lower layer, inlets and outlets for the two liquids, and an external recycling system, which removes liquid from each layer intermediate the inlets and outlets and discharges it into the other liquid layer.

6 Claims, 1 Drawing Figure

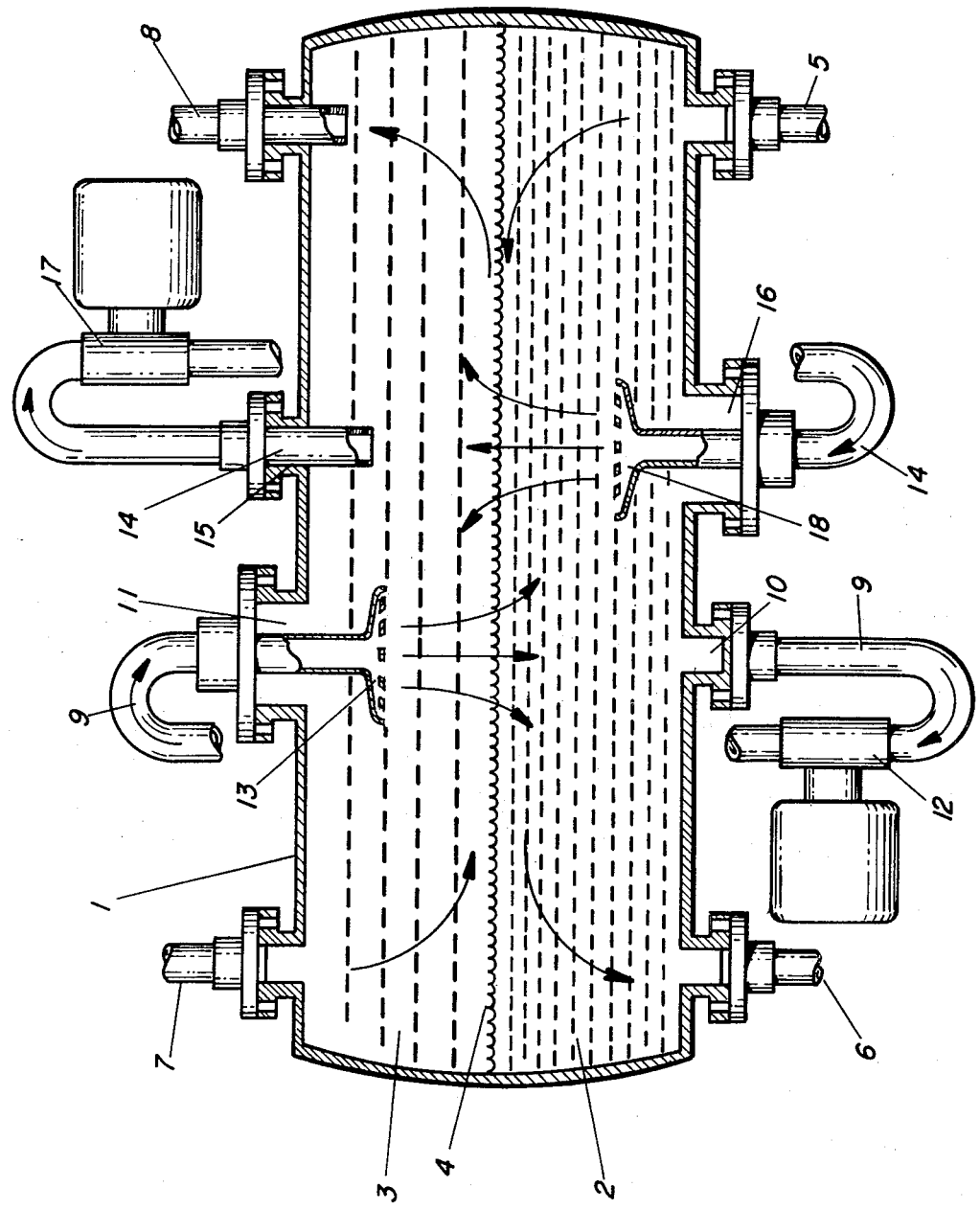

APPARATUS AND PROCESS FOR CONTACTING IMMISCIBLE LIQUIDS

The invention described herein may be manufactured, used and licensed by or for the Government for governmental purposes without the payment to me of any royalty thereon.

BACKGROUND OF THE INVENTION

Various types of apparatus have been utilized for carrying out continuous reactions, extractions, etc. involving contacting two immiscible liquid phases of different densities. Generally in such operations the two phases are vigorously contacted to produce an emulsion, which is then allowed to settle and separate in another zone, often a separate vessel. Recently, processes and apparatus have been developed, wherein the two phases are continuously and efficiently contacted without the formation of emulsions, thus eliminating the time and additional equipment required for separating the emulsions. Chemical Engineering, Aug. 26, 1971, pages 76, 86 and 87, describes a commercial apparatus of the latter type, which comprises a cylindrical horizontal shell provided with a series of discs mounted on a central shaft between which are mounted buckets. The interface level of the liquids is kept on the centerline of the unit and the phases are fed and removed from opposite ends of the shell to give countercurrent flow, the flow occurring through a small peripheral clearance between the edges of the discs and the inside wall of the shell. In operation the central shaft is rotated, whereby the buckets fill with one phase, carry and discharge it so that it passes through the other phase in the form of drops to the interface, the rate of rotation being such that an emulsion is not formed and a clear interface is maintained. Such apparatus, however, does not possess free internal volume for installing heating or cooling coils required in carrying out chemical reactions, such as nitration. Also, the apparatus does not permit substantial flexibility in control of the size and velocity of the liquid drops discharged into the other phase.

SUMMARY OF THE INVENTION

The present invention provides a novel apparatus and process for continuously contacting two substantially immiscible liquids of different densities. The apparatus includes a vessel wherein the heavier liquid constitutes The lower layer and the lighter liquid forms the upper layer. The vessel is provided with inlets and outlets for both liquids, and at least one external recycling system intermediate said inlets and outlets, which pumps liquid from one layer into the other liquid layer in the form of droplets, which pass across said layer to the interface, whereby contact between the two liquid phases is maximized.

It is therefore a principal object of this invention to provide a simpler and more efficient apparatus and process for continuously contacting a pair of mutually immiscible liquid phases of different densities.

Other objects are obvious or will appear from the following description of this invention.

DESCRIPTION OF DRAWING

The drawing is a diagrammatic side elevation of apparatus of the invention.

DETAILED DESCRIPTION OF THE INVENTION

Referring in detail to the drawing, wherein reference character 1 indicates a horizontal cylindrical tank containing two substantially immiscible liquid phases of different densities, wherein the heavier or more dense liquid forms a lower layer 2 and the lighter or less dense liquid constitutes an upper, supernatant layer 3 forming interface 4. The tank possesses inlet 5 and outlet 6 resp. for introducing the heavier liquid into lower layer 2 and removing liquid therefrom, and inlet 7 and outlet 8 resp. for introducing the lighter liquid into upper layer 3 and removing liquid therefrom for counter current flow. The tank is provided with an external recycling system for recycling heavier liquid from the lower layer 2 across the lighter liquid layer 3, which comprises a conduit 9 connecting an outlet 10 and an inlet 11 in tank 1. Conduit 9 possesses an in-line motor driven pump 12 and a device, such as a showerhead 13, for discharging heavier liquid from lower layer 2 in finely divided form, e.g., droplets, into the supernatant lighter liquid phase 3. The tank also possesses a similar external recycling system for recycling lighter liquid from the upper layer 3 through the lower layer of heavier liquid 2, which comprises a conduit 14 connected to an outlet 15 and an inlet 16 in tank 1 and provided with an in-line pump 17 and a showerhead 18.

To start operation, the heavier liquid 2 is fed through inlet 5 until the liquid level reaches about the midpoint of tank 1, after which the lighter liquid 3 is fed through inlet 7 until the tank is almost full, whereby two liquid layers or phases are established with interface 4 in the tank. Thereafter, outlets 6 and 8 are opened and continuous feed of both liquids is commenced. Contact between the liquid layers, which flow counter-currently through the tank, is optimized by continuously pumping the heavier liquid 2 through conduit 9 and showerhead 13 as droplets into the layer of lighter liquid 3, and the lighter liquid 3 through conduit 14 and showerhead 18 into lighter liquid layer 2. Due to the density difference between the two liquid phases, the droplets thus introduced return to the interface and thus to their parent liquid layers without the production of emulsions. The liquid phases thus treated in the process continuously flow out of tank 1 through outlets 6 and 8.

The feed rates and relative ratios of the two immiscible liquids of different densities, and rates of recycling thereof within the tank can be adjusted to provide optimum conditions. Further, the two liquid phases can flow through the tank countercurrently or concurrently. Also, the location of the inlets and outlets of the external recycling systems in the tank as well as the number of such external recycling systems can be varied, as desired. It is desirable, especially when a plurality of recycling systems for each liquid is utilized, that each recycling system be positioned and adapted to return the liquid to the interface proximate, i.e., neither substantially downstream nor upstream in the layer, with respect to the zone from which it is removed. Further, in place of the showerhead shown in the drawing, any device can be employed which is suitable for introducing recycled liquid of one phase into the other liquid phase in finely divided form, e.g., droplets, fine streams, etc. In addition, heating and cooling coils, baffling, instrument probes, additional piping, etc., can be introduced as desired, into the contactor tank, which can vary widely in size and shape.

It is thus evident that the novel apparatus provides important advantages over the aforementioned prior art continuous contactor in that it permits 1. greater control of the size and velocity of the recycled liquid phase discharged into the other liquid phase;
2. room for installing heating or cooling coils and other equipment within the tank;
3. advantages in simplicity of construction and ease of maintenance.

The apparatus of this invention can be employed to extract one or more components or impurities from a liquid phase of one density by contacting it with another liquid phase of a different density immiscible therewith. Besides extractions, the invention can be advantageously employed for conducting chemical reactions, e.g., nitrations and sulfonations, wherein a liquid phase containing one reaction component, e.g., benzene, toluene, etc. is contacted with a liquid phase of different density and immiscible therewith containing the other reaction component, e.g., nitric acid and/or sulfuric acid.

Of special interest is the use of the invention for nitrating toluene, particularly to trinitrotoluene (TNT). The conventional continuous process for nitrating toluene to TNT involves feeding toluene, sulfuric acid and nitric acid through a series of nitrators, additional acid being introduced and spent acid being removed, as required. At present seven or eight nitrators, including settling tanks, are required, which is partly due to the cocurrent flow of toluene and acids within the nitrators. By contacting the toluene and nitrating acid countercurrently in the present apparatus, wherein the two reactant phases are externally recycled and intimately contacted as described above and cooling coils are provided for controlling the reaction temperature, a lesser number of reactors are required and settling tanks are eliminated. Suitable inlets can be provided in apparatus of this invention for introducing additional nitrating acid in such nitration process, if desired.

I wish it to be understood that I do not desire to be limited to the exact method and detail of construction described for obvious modification will occur to persons skilled in the art.

What is claimed is:

1. An apparatus for continuously contacting two substantially immiscible liquids of different densities comprising in combination:
    a vessel wherein the lighter liquid forms an upper layer and the heavier liquid forms a lower layer;
    an inlet and an outlet for each of said liquids; and
    at least one external recycling system intermediate said inlet and said outlet, which comprises means for removing liquid from the lower layer and introducing same into the upper layer, and at least one external recycling system intermediate said inlet and said outlet, which comprises means for removing liquid from the upper layer and introducing same into the lower layer.
2. The apparatus of claim 1, wherein the vessel is a horizontal vessel and the inlet and outlet for each liquid are essentially at opposite ends of said vessel.
3. The apparatus of claim 2, wherein each of said external recycling systems comprises an external conduit, one end of which is connected to an intermediate outlet in said vessel for removing liquid from one layer, and the other end is connected to an intermediate inlet in said vessel for introducing said liquid in finely divided form into the other layer, and a pump for circulating said liquid through said conduit.
4. The apparatus of claim 3, wherein the outlet and inlet of each recycling system are located in approximately the same vertical plane, which is laterally spaced from that of another external recycling system.
5. Process for continuously contacting two immiscible liquids of different densities, which comprises:
    establishing a lower layer of the heavier liquid and an upper layer of the lighter liquid;
    continuously feeding lighter liquid into the upper layer and heavier liquid into the lower layer;
    continuously removing liquid from each layer in proportion to the feed into each layer; and
    continuously recycling liquid from the heavier liquid layer through the lighter liquid layer and continuously recycling liquid from the lighter liquid through the heavier liquid, said recycling comprising continuously withdrawing a stream of liquid from each layer, introducing said stream in finely divided form into the other layer and allowing the finely divided liquid to pass through said other layer to the parent layer.
6. Process according to claim 5, wherein the liquid in each layer is withdrawn from a plurality of zones spaced in the direction of flow and returned to the parent layer proximate to the zone from which it is withdrawn.

* * * * *